(12) United States Patent
Martinek et al.

(10) Patent No.: US 7,043,641 B1
(45) Date of Patent: May 9, 2006

(54) ENCRYPTION IN A SECURE COMPUTERIZED GAMING SYSTEM

(75) Inventors: Michael G. Martinek, Fort Collins, CO (US); Mark D. Jackson, Fort Collins, CO (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/520,404

(22) Filed: Mar. 8, 2000

(51) Int. Cl.
 *H04L 9/00* (2006.01)
 *G06F 12/14* (2006.01)
 *G06F 17/00* (2006.01)
 *G06F 19/00* (2006.01)
 *H04K 1/00* (2006.01)

(52) U.S. Cl. .................. 713/187; 713/176; 380/251; 463/29

(58) Field of Classification Search ............... 380/251; 713/187, 150, 168, 175, 176–181, 189, 193, 713/194, 200–202; 463/1, 29, 40–43
See application file for complete search history.

(56) References Cited

U.S. PATENT DOCUMENTS

| | | | |
|---|---|---|---|
| 3,825,905 A | 7/1974 | Allen, Jr. | |
| 3,838,264 A | 9/1974 | Maker | |
| 4,072,930 A | 2/1978 | Lucero et al. | |
| 4,193,131 A | 3/1980 | Lennon et al. | |
| 4,200,770 A | 4/1980 | Hellman et al. | |
| 4,218,582 A | 8/1980 | Hellman et al. | |
| 4,354,251 A | 10/1982 | Hellwig et al. | |
| 4,355,390 A | 10/1982 | Hellwig et al. | |
| 4,405,829 A | 9/1983 | Rivest et al. | |
| 4,458,315 A | 7/1984 | Uchenick | |
| 4,462,076 A | 7/1984 | Smith, III | |
| 4,467,424 A | 8/1984 | Hedges et al. | |
| 4,494,114 A | 1/1985 | Kaish et al. | |
| 4,519,077 A | 5/1985 | Amin | |
| 4,525,599 A | 6/1985 | Curran et al. | |
| 4,582,324 A | 4/1986 | Koza et al. | |
| 4,607,844 A | 8/1986 | Fullerton | |
| 4,652,998 A | 3/1987 | Koza et al. | |
| 4,658,093 A | 4/1987 | Hellman | |
| 4,727,544 A | 2/1988 | Brunner et al. | |
| 4,752,068 A | 6/1988 | Endo | |
| 4,759,064 A | 7/1988 | Chaum | |

(Continued)

FOREIGN PATENT DOCUMENTS

DE 37 00 861 A1 7/1988

(Continued)

OTHER PUBLICATIONS

Answer and Counterclaims to Second Amended Complaint filed in connection with Civil Action No. CV-S-0 1-1498, pp. 1-26 and certificate of service page.

(Continued)

*Primary Examiner*—Christopher Revak
(74) *Attorney, Agent, or Firm*—Beyer Weaver & Thomas LLP (57) ABSTRACT

An architecture and method for a gaming-specific platform are disclosed that features secure storage and verification of game code and other data, provides the ability to securely exchange data with a computerized wagering gaming system, and does so in a manner that is straightforward and easy to manage. Some embodiments provide the ability to identify game program code as certified or approved, such as by the Nevada Gaming Regulations Commission or other regulatory agency. These and other functions make use of encryption, including digital signatures and hash functions as well as other encryption methods.

29 Claims, 4 Drawing Sheets

U.S. PATENT DOCUMENTS

| | | |
|---|---|---|
| 4,817,140 A | 3/1989 | Chandra et al. |
| 4,837,728 A | 6/1989 | Barrie et al. |
| 4,845,715 A | 7/1989 | Francisco |
| 4,856,787 A | 8/1989 | Itkis |
| 4,865,321 A | 9/1989 | Nakagawa et al. |
| 4,911,449 A | 3/1990 | Dickinson et al. |
| 4,930,073 A | 5/1990 | Cina, Jr. |
| 5,050,212 A | 6/1990 | Dyson |
| 4,944,008 A | 7/1990 | Piosenka et al. |
| 4,951,149 A | 8/1990 | Faroudja |
| 5,004,232 A | 4/1991 | Wong et al. |
| 5,021,772 A | 6/1991 | King et al. |
| 5,103,081 A | 4/1992 | Fisher et al. |
| 5,109,152 A | 4/1992 | Takagi et al. |
| 5,146,575 A | 9/1992 | Nolan |
| 5,155,680 A | 10/1992 | Wiedener |
| 5,155,768 A | 10/1992 | Matsuhara |
| 5,161,193 A | 11/1992 | Lampson et al. |
| 5,179,517 A | 1/1993 | Sarbin |
| 5,224,160 A | 6/1993 | Paulini et al. |
| 5,235,642 A | 8/1993 | Wobber et al. |
| 5,259,613 A | 11/1993 | Marnell |
| 5,283,734 A | 2/1994 | Von Kohorn |
| 5,288,978 A | 2/1994 | Iijima |
| 5,291,585 A | 3/1994 | Sato et al. |
| 5,297,205 A | 3/1994 | Audebert et al. |
| 5,326,104 A | 7/1994 | Pease et al. |
| 5,342,047 A | 8/1994 | Heidel et al. |
| 5,343,527 A | 8/1994 | Moore |
| 5,398,932 A | 3/1995 | Eberhardt et al. |
| 5,421,006 A | 5/1995 | Jablon et al. |
| 5,465,364 A | 11/1995 | Lathrop et al. |
| 5,488,702 A | 1/1996 | Byers et al. |
| 5,489,095 A | 2/1996 | Goudard et al. |
| 5,507,489 A | 4/1996 | Reibel et al. |
| 5,586,766 A | 12/1996 | Forte et al. |
| 5,586,937 A | 12/1996 | Menashe |
| 5,604,801 A | 2/1997 | Dolan et al. |
| 5,611,730 A | 3/1997 | Weiss |
| 5,643,086 A | 7/1997 | Alcorn et al. |
| 5,644,704 A | 7/1997 | Pease et al. |
| 5,655,965 A | 8/1997 | Takemoto et al. |
| 5,668,945 A | 9/1997 | Ohba et al. |
| 5,704,835 A | 1/1998 | Dietz, II |
| 5,707,286 A | 1/1998 | Carlson |
| 5,725,428 A | 3/1998 | Achmuller |
| 5,737,418 A | 4/1998 | Saffari et al. |
| 5,742,616 A | 4/1998 | Torreiter et al. |
| 5,758,875 A | 6/1998 | Giacalone, Jr. |
| 5,759,102 A | 6/1998 | Pease et al. |
| 5,768,382 A | 6/1998 | Schneier et al. |
| 5,800,268 A | 9/1998 | Molnick |
| 5,823,874 A | 10/1998 | Adams |
| 5,848,932 A | 12/1998 | Adams |
| 5,863,041 A | 1/1999 | Boylan et al. |
| 5,871,400 A | 2/1999 | Yfantis |
| 5,879,234 A | 3/1999 | Mengual |
| 4,848,744 A | 7/1999 | Steininger et al. |
| 5,934,672 A | 8/1999 | Sines et al. |
| 5,954,583 A | 9/1999 | Green |
| 5,971,851 A | 10/1999 | Pascal et al. |
| 5,991,399 A | 11/1999 | Graunke et al. |
| 6,044,471 A * | 3/2000 | Colvin ............ 713/202 |
| 6,071,190 A | 6/2000 | Weiss et al. |
| 6,104,815 A | 8/2000 | Alcorn et al. |
| 6,106,396 A | 8/2000 | Alcorn et al. |
| 6,149,522 A | 11/2000 | Alcorn et al. |
| 6,165,072 A * | 12/2000 | Davis et al. ............ 463/29 |
| 6,195,587 B1 | 2/2001 | Hruska et al. |
| 6,203,427 B1 | 3/2001 | Walker et al. |
| 6,264,557 B1 | 7/2001 | Schneier et al. |
| 6,364,769 B1 * | 4/2002 | Weiss et al. ............ 463/29 |
| 6,368,219 B1 * | 4/2002 | Szrek et al. ............ 463/42 |
| 6,446,211 B1 * | 9/2002 | Colvin ............ 713/202 |
| 6,460,142 B1 * | 10/2002 | Colvin ............ 713/202 |
| 6,484,264 B1 * | 11/2002 | Colvin ............ 713/202 |
| 6,502,195 B1 * | 12/2002 | Colvin ............ 713/202 |
| 6,577,733 B1 * | 6/2003 | Charrin ............ 380/251 |
| 6,620,047 B1 | 9/2003 | Alcorn et al. |
| 6,785,825 B1 * | 8/2004 | Colvin ............ 713/202 |
| 6,792,548 B1 * | 9/2004 | Colvin ............ 713/202 |
| 6,792,549 B1 * | 9/2004 | Colvin ............ 713/202 |
| 6,795,925 B1 * | 9/2004 | Colvin ............ 713/202 |
| 6,799,277 B1 * | 9/2004 | Colvin ............ 713/202 |
| 6,813,717 B1 * | 11/2004 | Colvin ............ 713/202 |
| 6,813,718 B1 * | 11/2004 | Colvin ............ 713/202 |
| 6,851,607 B1 | 2/2005 | Orus et al. |
| 6,857,078 B1 * | 2/2005 | Colvin ............ 713/202 |
| 2002/0049909 A1 * | 4/2002 | Jackson et al. ............ 713/188 |
| 2003/0014639 A1 * | 1/2003 | Jackson et al. ............ 713/181 |
| 2003/0195033 A1 * | 10/2003 | Gazdic et al. ............ 463/20 |
| 2003/0203755 A1 * | 10/2003 | Jackson ............ 463/42 |
| 2003/0203756 A1 * | 10/2003 | Jackson ............ 463/42 |
| 2004/0002381 A1 | 1/2004 | Alcorn et al. |

FOREIGN PATENT DOCUMENTS

| | | |
|---|---|---|
| DE | 40 14 477 A1 | 7/1991 |
| EP | 0685246 | 6/1995 |
| GB | 2072395 A | 9/1981 |
| GB | 2202984 A | 9/1981 |
| GB | 2 121 569 | 12/1983 |
| GB | 2201821 A | 9/1988 |
| WO | WO 99/65579 | 12/1999 |
| WO | WO 00/33196 | 6/2000 |

OTHER PUBLICATIONS

Defendants', Supplemental Response to Plaintiffs' First Set of Interrogatories filed in connection with Civil Action No. CV-S-0 1-1498, pp. 1-3,50-68 and 85-86.

Davida, G. et al., "Defending Systems Against Viruses through Cryptographic Authentication," Proceedings of the Symposium on Security and Privacy, *IEEE Comp. Soc. Press*, pp. 312-318 (May 1, 1989).

Document entitled "Fact Sheet on Digital Signature Standard" dated May 1994, 6 pages.

Federal Information Processing Standards (FIPS) Publication 180-1 entitled "Secure Hash Standard" dated Apr. 17, 1995, 2 title pages, abstract page and pp. 1-21.

Federal Information Processing Standards (FIPS) Publication 180 entitled "Secure Hash Standard" dated May 11, 1993, title page, abstract page and pp. 1-20.

Federal Information Processing Standards (FIPS) Publication 186 entitled "Digital Signature Standard (DSS)" dated Jan. 27, 2000, 17 pages.

Hellman, Martin E., "The Mathematics of Public-Key Crytography," Scientific American, vol. 241, No.8, Aug. 1979, pp. 146-152 and 154-157.

Rivest, et al., "A Method for Obtaining Digital Signatures and Public-Key Cryptosystems," Communications of the ACM, vol. 21, No.2, Feb. 1978, pp. 120-126.

Bauspiess et al., "Requirements For Crytographic Hash Functions," *Computers and Security,*5:427-437 (Sep. 11, 1992).

Complaint for patent infringement filed by Aristocrat Technologies, et al., dated Jan. 22, 2002, Civil Action No. CV-S-02-0091.

Bakhtiari et al., Crytographic Hash Functions: A Survey, 1995, Centre for Computer Security Research, pp. 1-26.

\* cited by examiner

ENCRYPTION IN A SECURE COMPUTERIZED GAMING SYSTEM

NOTICE OF CO-PENDING APPLICATIONS

This application is related to application Ser. No. 09/405,921 and to co-pending application Ser. No. 09/520,405, filed on the same date as the present application, entitled Computerized Gaming System, Method and Apparatus, which are hereby incorporated by reference.

TECHNICAL FIELD

Computerized wagering game systems, and more specifically to use of encryption and hash functions to ensure security in a computerized wagering game system are disclosed.

BACKGROUND

Games of chance have been enjoyed by people for thousands of years and have enjoyed increased and widespread popularity in recent times. As with most forms of entertainment, players enjoy playing a wide variety of games and new games. Playing new games adds to the excitement of "gaming." As is well known in the art and as used herein, the term "gaming" and "gaming devices" are used to indicate that some form of wagering is involved, and that players must make wagers of value, whether actual currency or some equivalent of value, e.g., token or credit.

One popular game of chance is the slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return value to the player. A standard device causes a plurality of reels to spin and ultimately stop, displaying a random combination of some form of indicia, for example, numbers or symbols. If this display contains one of a preselected plurality of winning combinations, the machine releases money into a payout chute or increments a credit meter by the amount won by the player. For example, if a player initially wagered two coins of a specific denomination and that player achieved a payout, that player may receive the same number or multiples of the wager amount in coins of the same denomination as wagered.

There are many different formats for generating the random display of events that can occur to determine payouts in wagering devices. The standard or original format was the use of three reels with symbols distributed over the face of the wheel. When the three reels were spun, they would eventually each stop in turn, displaying a combination of three symbols (e.g., with three wheels and the use of a single payout line as a row in the middle of the area where the symbols are displayed.) By appropriately distributing and varying the symbols on each of the reels, the random occurrence of predetermined winning combinations can be provided in mathematically predetermined probabilities. By clearly providing for specific probabilities for each of the preselected winning outcomes, precise odds that would control the amount of the payout for any particular combination and the percentage return on wagers for the house could be readily controlled.

Other formats of gaming apparatus that have developed in a progression from the pure slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video games therefore were simulated slot machines. The use of video gaming apparatus to play new games such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct pay lines, including randomly placed lines, scatter pays, or single image payouts. In addition to the variation in formats for the play of games, bonus plays, bonus awards, and progressive jackpots have been introduced with great success. The bonuses may be associated with the play of games that are quite distinct from the play of the original game, such as the video display of a horse race with bets on the individual horses randomly assigned to players that qualify for a bonus, the spinning of a random wheel with fixed amounts of a bonus payout on the wheel (or simulation thereof), or attempting to select a random card that is of higher value than a card exposed on behalf of a virtual dealer.

Examples of such gaming apparatus with a distinct bonus feature includes U.S. Pat. Nos. 5,823,874; 5,848,932; 5,836,041; U.K. Patent Nos. 2 201 821 A; 2 202 984 A; and 2 072 395A; and German Patent DE 40 14 477 A1. Each of these patents differ in fairly subtle ways as to the manner in which the bonus round is played. British patent 2 201 821 A and DE 37 00 861 A1 describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment.

U.S. Pat. Nos. 5,823,874 and 5,848,932 describe a gaming device comprising: a first, standard gaming unit for displaying a randomly selected combination of indicia, said displayed indicia selected from the group consisting of reels, indicia of reels, indicia of playing cards, and combinations thereof; means for generating at least one signal corresponding to at least one select display of indicia by said first, standard gaming unit; means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal. In effect, the second gaming event simulates a mechanical bonus indicator such as a roulette wheel or wheel with a pointing element.

A video terminal is another form of gaming device. Video terminals operate in the same manner as conventional slot or video machines except that a redemption ticket is issued rather than an immediate payout being dispensed.

The vast array of electronic video gaming apparatus that is commercially available is not standardized within the industry or necessarily even within the commercial line of apparatus available from a single manufacturer. One of the reasons for this lack of uniformity or standardization is the fact that the operating systems that have been used to date in the industry are primitive. As a result, the programmer must often create code for each and every function performed by each individual apparatus. To date, no manufacturer is known to have been successful in creating a universal operating system for converting existing equipment (that includes features such as reusable modules of code) at least in part because of the limitations in utility and compatibility of the operating systems in use. When new games are created, new hardware and software is typically created from the ground up.

At least one attempt has been made to create a universal gaming engine that segregates the code associated with random number generation and algorithms applied to the random number string from the balance of the code. Carlson U.S. Pat. No. 5,707,286 describes such a device. This patentee recognized that modular code would be beneficial, but only contemplated making RNJ and transfer algorithms modular.

The lack of a standard operating system has contributed to maintaining an artificially high price for the systems in the market. The use of unique hardware interfaces in the various manufactured video gaming systems is a contributing factor. The different hardware, the different access codes, the different pin couplings, the different harnesses for coupling of pins, the different functions provided from the various pins, and the other various and different configurations within the systems has prevented any standard from developing within the technical field. This is advantageous to the apparatus manufacturer, because the games for each system are provided exclusively by a single manufacturer, and the entire systems can be readily obsoleted, so that the market will have to purchase a complete unit rather than merely replacement software. Also, competitors cannot easily provide a single game that can be played on different hardware. A solution to this problem is presented in our co-pending application for Video Gaming Apparatus for Wagering with Universal Computerized Controller and I/O Interface for Unique Architecture, assigned Ser. No. 09/405,921, and filed Sep. 24, 1999, the disclosure that is incorporated herein by reference.

The invention of computerized gaming systems that include a common or universal video wagering game controller that can be installed in a broad range of video gaming apparatus without substantial modification to the game controller has made possible the standardization of many components and of corresponding gaming software within gaming systems. Such systems desirably will have functions and features that are specifically tailored to the unique demands of supporting a variety of games and gaming apparatus types, and will do so in a manner that is efficient, secure, and cost-effective.

In addition to making communication between a universal operating system and non-standard machine devices such as coin hoppers, monitors, bill validators and the like possible, it would be desirable to provide security features that enable the operating system to verify that game code and other data has not changed during operation.

Alcorn et al. U.S. Pat. No. 5,643,086 describes a gaming system that is capable of authenticating an application or game program stored on a mass media device such as a CD-ROM, RAM, ROM or other device using hashing and encryption techniques. The mass storage device may be located in the gaming machine, or may be external to the gaming machine. This verification technique therefore will not detect any changes that occur in the code that is executing because it tests the code residing in mass storage prior to loading into RAM.

What is desired is an architecture and method providing a gaming-specific platform that features secure storage and verification of game code and other data, provides the ability to securely change game code on computerized wagering gaming system, and has the ability to verify that the code has not changed during operation of the gaming machine.

It is further desired that the game program code be identifiable as certified or approved, such as by the Nevada Gaming Regulations Commission or other regulatory agency.

SUMMARY OF THE DISCLOSURE

An architecture and method for a wagering game-specific platform are disclosed that features secure storage and verification of game code and other data, provides the ability to securely exchange data with a computerized wagering gaming system, and does so in a manner that is straightforward and easy to manage. Some embodiments provide the ability to identify game program code as certified or approved, such as by the Nevada Gaming Regulations Commission or other regulatory agency. These and other functions are provided by use of encryption, including digital signatures and hash functions as well as other encryption methods. Such functions are advantageously applied to data loaded into RAM and occur while the gaming machine is in operation.

DETAILED DESCRIPTION OF THE PRESENTLY PREFERRED EMBODIMENTS

In the following detailed description of the presently preferred embodiments, reference is made to the accompanying drawings which form a part hereof, and in which is shown by way of illustration specific sample embodiments. These embodiments are described in sufficient detail to enable those skilled in the art to practice the disclosed concepts, and it is to be understood that other embodiments may be utilized and that logical, mechanical, electrical, and other changes may be made without departing from the spirit or scope of this disclosure. The following detailed description is, therefore, not to be taken in a limiting sense, and the scope of the disclosed embodiments is defined only by the appended claims.

An architecture and method for a universal operating system that features secure storage and verification of game code and other data, provides the ability to securely exchange data with a computerized wagering gaming system, and does so in a manner that is straightforward and easy to manage. Some embodiments provide the ability to identify game program code as certified or approved, such as by the Nevada Gaming Commission or other regulatory agency. These and other functions are provided by use of encryption, including digital signatures and hash functions as well as other encryption methods to data being executed. Because hash functions and other encryption methods are employed widely in the present invention, they are introduced and discussed here.

"Hash functions" for purposes of this disclosure are a type of function that generates a unique data string, typically of fixed length from variable strings of characters or text. The data string generated is typically substantially smaller than the text string itself, but is long enough that it is unlikely that the same number will be produced by the hash function from different strings of text. The formula employed in the hash function must also be chosen such that it is unlikely that different text strings will produce the same hash value. An example of a suitable hash function is a 160 bit SHA hash. Regardless of file size, the hash value will be 160 bits in length.

The hashed data string is commonly referred to as a "message digest." A message digest can be stored for future use, or encrypted and then stored in non-volatile memory, for example.

Hash functions are often used to hash data records to produce unique numeric values corresponding to each data record in a database, which can then be applied to a search string to reproduce the hash value. The hash value can then be used as an index key, eliminating the need to search an entire database for the requested data. Some hash functions are known as one-way hash functions, meaning that with such a function it is extremely difficult to derive a text string that will produce a given hash value, but relatively easy to produce a hash value from a text string. This ensures that it is not feasible to modify the content of the text string and produce the same hash value.

Such a function can be used to hash a given character string and produce a first hash value that can later be compared to a second hash value derived from the same character string, to ensure the character string has not changed. If the character string has been altered, the hash values produced by the same hash function will be different. The integrity of the first hash value can be protected against alteration by use of other encryption methods such as the use of a digital signature.

Digital signatures are employed to sign electronic documents or character strings, and ensure that the character string has not been altered since signing. Digital signatures typically are employed to indicate that a character string was intentionally signed with an unforgeable signature that is not reusable with another document, and that the signed document is unalterable. The digital signing mechanism or method is designed to meet these criteria, typically by using complex mathematical encryption techniques.

One example is use of a public key/private key encryption system to sign a document. In a public key/private key system a user has a pair of keys, either of which may be used to encrypt or decrypt a document. The public key is published or distributed in a manner that reasonably ensures that the key in face belongs to the key owner, and the private key is kept strictly secret. If someone wishes to send a character string that only a certain person may read, the character string is encrypted before sending using the intended reader's public key. The character string is then visible only by using the intended reader's private key to decrypt the character string.

However, if a user wishes to send a character string in such a manner that the document is virtually guaranteed to be the authentic document created by the sender but essentially anyone can read it, the user can sign the document by encrypting it with his private key before sending. Anyone can then decrypt the document with the signer's public key which is typically widely distributed, and can thereby verify that the character string was signed by the key pair owner. This example embodiment meets the requirements of a digital signature, ensuring that a character string was intentionally signed with an unforgeable signature that is not reusable with another document, and that the signed document is unalterable.

Because encryption of large character strings such as large computer programs or long text documents can require a substantial amount of time to encrypt and decrypt, some embodiments of digital signatures implement one-way hash functions. In one such embodiment, the signer uses a known one-way hash algorithm to create a hash value for the character string, and encrypts the hash value with his private key. The document and signed hash value are then sent to the recipient, who runs the same hash function on the character string and compares the resulting hash value with the hash value produced by decrypting the signed hash value with the signer's public key. Such a method provides very good security, as long as the hash function and encryption algorithm employed are suitably strong.

Encryption of data via a public key/private key system is useful not only for producing digital signatures, but also for encryption of data before sending or storing the data or to keep data secure or secret in other applications. Similarly, symmetric encryption techniques which rely on encryption and decryption of the same single secret key may be applied to such applications. For example, transmission of program data between a network server and a computerized wagering game apparatus may be secured via a symmetric encryption technique, and the program data received in the game apparatus may be verified as approved by a regulatory agency via a digital signature employing hash functions and public key cryptography before execution.

Other encryption methods and formulas exist, and are also usable consistent with the disclosed embodiments. Some symmetric encryption methods, such as DES (Data Encryption Standard) and its variants rely on the secrecy of a single key, and so may not be adaptable to methods described herein that require a key pair with a public key. A variety of other encryption methods, such as RSA and Diffie-Hellman are consistent with public/private key methods, and are usable in these methods. Various hash functions may also be employed, such as MD5 or SHA, and will be useful in many aspects consistent with this disclosure so long as they are sufficiently nonreversible to be considered one-way hash functions. Various encryption methods will also provide varying degrees of security, from those that are relatively easy to defeat to those that are extremely difficult to defeat. These various degrees of security are to be considered within the scope of encryption methods consistent with this application, including various degrees of security that may to varying degrees of probability make encrypted data unforgeable, unreadable, or the like. A variety of encryption methods exist and are expected to be developed in the future, all of which are likely to be employable in some aspect consistent with the present invention, and are within the scope of the invention.

Figure 1:
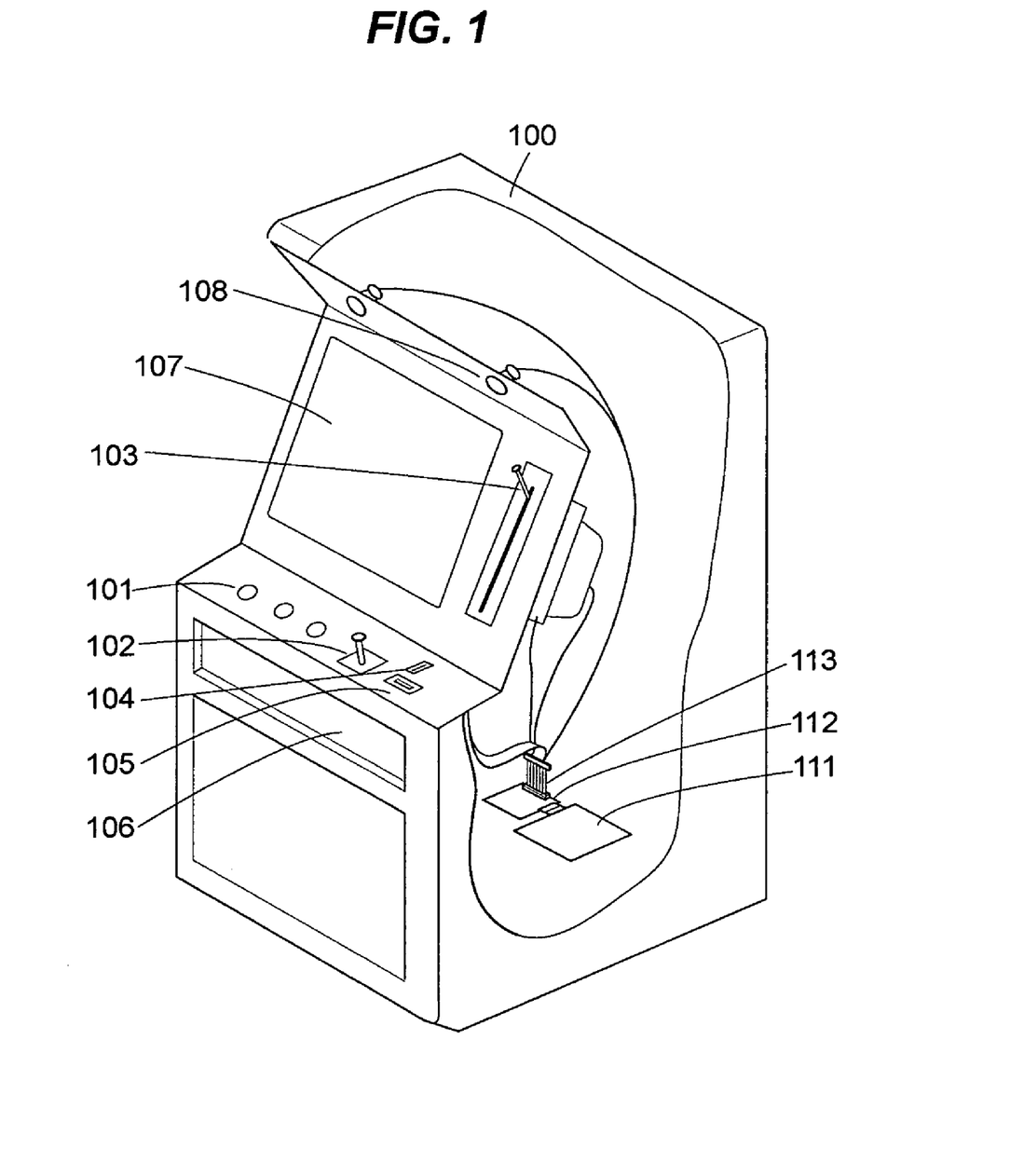
FIG. 1 shows a computerized wagering game apparatus such as may be used to practice some disclosed embodiments.

FIG. 1 shows an exemplary gaming system 100, illustrating a variety of components typically found in gaming systems and how they may be used in accordance with the present invention. User interface devices in this gaming system include push buttons 101, joystick 102, and pull arm 103. Credit for wagering may be established via coin or token slot 104, a device 105 such as a bill receiver or card reader, or any other credit input device. A card reader 105 may also provide the ability to record credit information on a user's card when the user has completed gaming, or credit may be returned via a coin tray 106 or other credit return device. Information is provided to the user by devices such as video screen 107, which may be a cathode ray tube (CRT), liquid crystal display (LCD) panel, plasma display, light-emitting diode (LED) display, or other display device that produces a visual image under control of the computerized game controller. Also, buttons 101 may be illuminated to indicate what buttons may be used to provide valid input to the game system at any point in the game. Still other lights or other visual indicators may be provided to indicate game information or for other purposes such as to attract the attention of prospective game users. Sound is provided via speakers 108, and also may be used to indicate game status, to attract prospective game users, or for other purposes, under the control of the computerized game controller.

The gaming system 100 further comprises a computerized game controller 111 and I/O interface 112, connected via a wiring harness 113. The universal game controller 111 need not have its software or hardware designed to conform to the interface requirements of various gaming system user interface assemblies, but can be designed once and can control various gaming systems via I/O interfaces 112 designed to properly interface an input and/or output of the universal computerized game controller to the interface assemblies found within the various gaming systems.

In some embodiments, the universal game controller 111 is a standard IBM Personal Computer-compatible (PC compatible) computer. Still other embodiments of a universal game controller comprise general purpose computer systems such as embedded controller boards or modular computer systems. Examples of such embodiments include a PC compatible computer with a PC/104 bus, which is an example of a modular computer system that features a compact size and low power consumption while retaining PC software and hardware compatibility. The universal game controller provides all functions necessary to implement a wide variety of games by loading various program code on the universal controller, thereby providing a common platform for game development and delivery to customers for use in a variety of gaming systems. Other universal computerized game controllers consistent with the present invention may include any general-purpose computers that are capable of supporting a variety of gaming system software, such as universal controllers optimized for cost effectiveness in gaming applications or that contain other special-purpose elements yet retain the ability to load and execute a variety of gaming software.

In yet other embodiments, the universal controller with security features can be used for other applications, including controlling networked in-line systems such as progressive controllers and player tracking systems. The invention can also be used for kiosk displays and creating picture in picture features on a video display.

The universal computerized game controller of some embodiments is a computer running an operating system with a gaming application-specific kernel such as a customized Linux kernel. In further embodiments, a system handler application layer of code executes within the kernel, further providing common game functionality to the programmer. The game program in such embodiments is therefore only a fraction of the total code, and relies on the system handler application layer and kernel to provide commonly used gaming functions. Still other embodiments will have various levels of application code, ranging from embodiments containing several layers of game-specific code to a single-layer of game software running without an operating system or kernel but providing its own computer system management capability.

Figure 2:
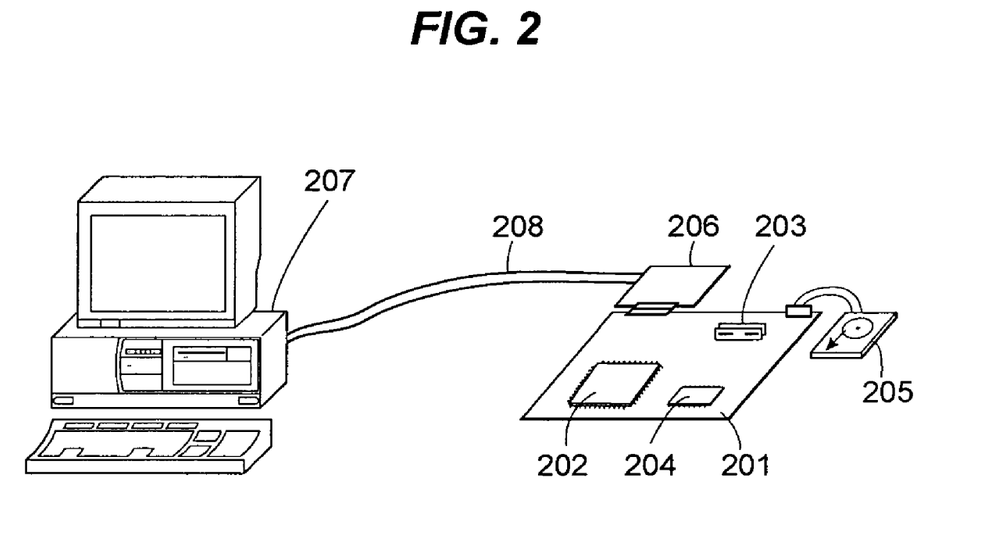
FIG. 2 shows a diagram of a networked computer connected to certain components comprising a portion of a computerized wagering game apparatus, consistent with some disclosed embodiments.

FIG. 2 illustrates a networked computer connected to selected items that comprise a part of a computerized wagering game apparatus, as are used in various embodiments. The computerized game controller 201 has a processor 202, memory 203, and nonvolatile memory 204. One example of nonvolatile memory is a flash disk on chip (hereinafter "flash disk"). The flash disk is advantageously read/write, yet retains information stored on disk upon power down. Attached to the computerized game controller of some embodiments is a mass storage device 205, and a network interface adaptor 206. The network interface adaptor is attached to a networked computer 207 via network connection 208. The various components of FIG. 2 exist within disclosed embodiments, and are illustrated to show the manner in which the various components are associated.

The computerized wagering game controller of the invention is operable to control a computerized wagering game, and is operable to employ encryption in various embodiments to provide data security. The computerized game controller 201 in some embodiments is a general-purpose computer, such as an IBM PC-compatible computer. The game controller executes an operating system, such as Linux or Microsoft Windows, which in further embodiments is modified to execute within the computerized gaming apparatus. The computerized game controller also executes game code, which may be loaded into memory 203 from either a mass storage device 205 such as a hard disc drive, or nonvolatile memory 204 such as flash memory or EPROM memory before execution. In some embodiments, the computerized game controller 201 loads encryption functions into memory 203, and those functions are subsequently executed to securely load other gaming system data from the mass storage device 205.

In further embodiments, the computerized game controller exchanges data with a networked computer 207 via a network connection 208 and a network interface adapter 206. Data exchanged via the network connection is encrypted in some embodiments of the invention, to ensure security of the exchanged data. The data to be exchanged in various embodiments comprises game program data, computerized gaming apparatus report data, data comprising commands to control the operation of the computerized gaming apparatus, and other computerized gaming apparatus data. Employing encryption in exchanging such data provides a degree of security, ensuring that such data is not altered or forged.

The invention employs encryption, including hash functions, symmetric encryption, and public key/private key encryption in various embodiments, which provides a degree of confidence that data utilized by the computerized gaming system and protected by encryption in accordance with the invention is not altered or forged. The data within the scope of this disclosure includes but is not limited to data comprising programs such as operating system or game program data, computerized gaming machine status data such as credits or other game state data, control instruction data for controlling the operation of the computerized gaming apparatus, and other computerized gaming machine data.

One embodiment of the invention comprises the use of hash functions to calculate a reference hash value for selected data, which can later be compared to a hash value calculated from the same data or a copy of the data to ensure the data has not been altered. The hash functions employed will desirably be one-way hash functions, to provide a greater degree of certainty that the reference hash value cannot be used in reverse to produce corresponding altered data. In a further embodiment, the data is hashed repeatedly by a continuously executing program thread that ensures that the data is not altered during the course of operation of the computerized wagering game. The data that is continuously hashed is in some embodiments is continuously hashed after being loaded into memory 203 for use by the computerized game controller.

If the reference hash value and the calculated hash value do not match, the computerized gaming apparatus will desirably provide some indication of the hash failure. In one embodiment, the game is brought to a locked or "tilt" state that prevents wagering upon a hash check failure. In a further embodiment, notification of the hash failure is sent to a networked computer 207 to alert the computer's user of the hash failure. In some embodiments, the computerized wagering game apparatus provides limited function to check the status of the game, including in further embodiments functions accessible only by operating controls within the computerized wagering game apparatus secure housing.

In one embodiment, the operating system as described in my copending application for Computerized Gaming System, Method and Apparatus, filed on the same date as this application, cooperates with a library of "shared objects" that are specific to the game application. For purposes of this disclosure, a "shared object" is defined as self-contained, functional units of game code that define a particular feature set or sequence of operation for a game. The personality and behavior of a gaming machine of the present invention are defined by the particular set of shared objects called and executed by the operating system. Within a single game, numerous shared objects may be dynamically loaded and executed. This definition is in contrast with the conventional meaning of a shared object, which typically provides an API to multiple programs. An API is an application Programming Interface, and includes a library of functions.

Figure 3:
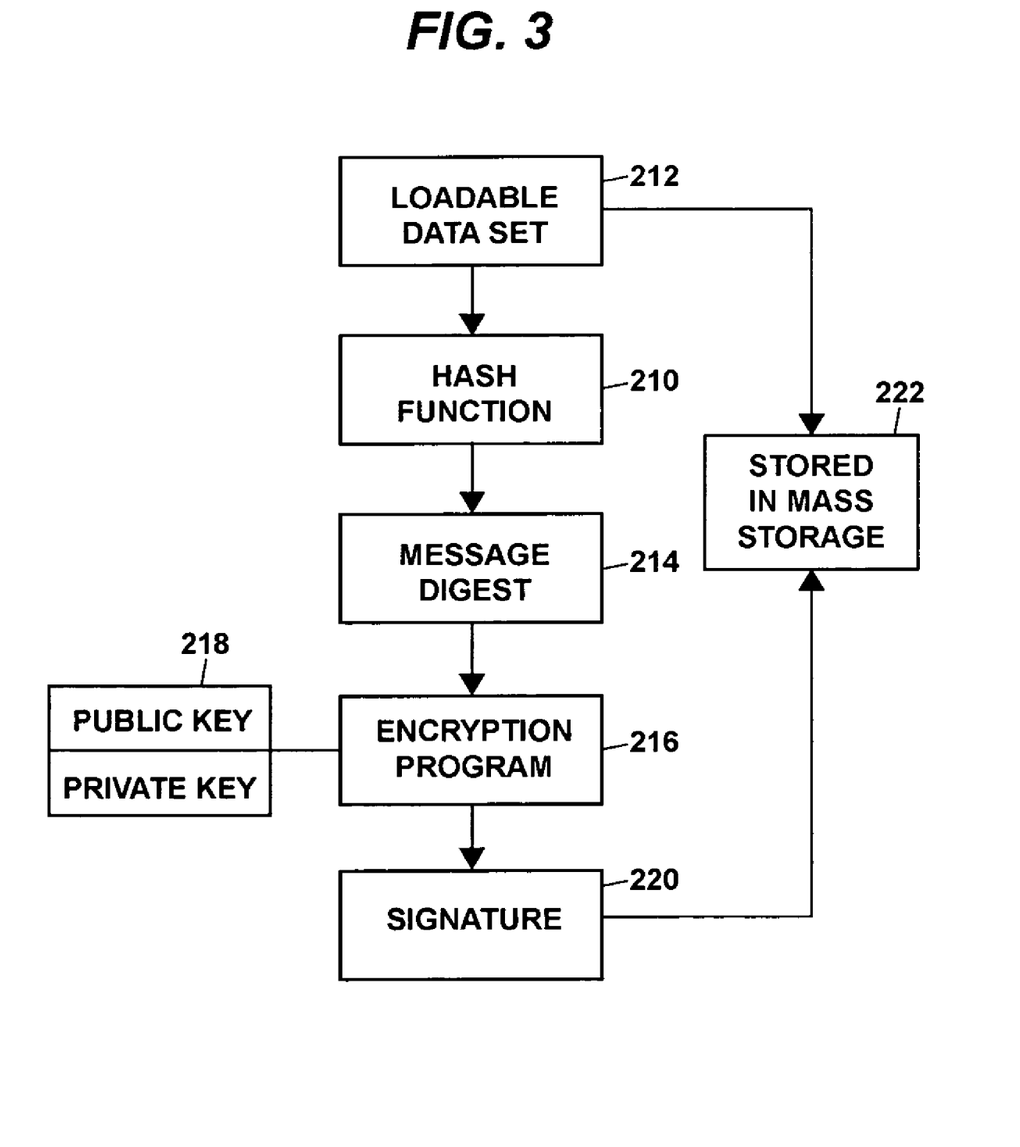
FIG. 3 is a diagram of a process of creating a signature for a loadable data set, utilizing a public/private key algorithm.

The shared object code, as well as other data may be verified according to one embodiment by first preparing a signature from data, as shown in FIG. 3. The signature may be prepared by first hashing 210 the data set 212 to create a message digest 214. The message digest is encrypted via an encryption program that is stored on ROM utilizing a private/public key algorithm 218, forming a unique signature 220. The data and signature are then stored on a mass storage device 222 such as a network storage device, hard drive, CD-ROM, RAM, flash disk or the like.

Figure 4:
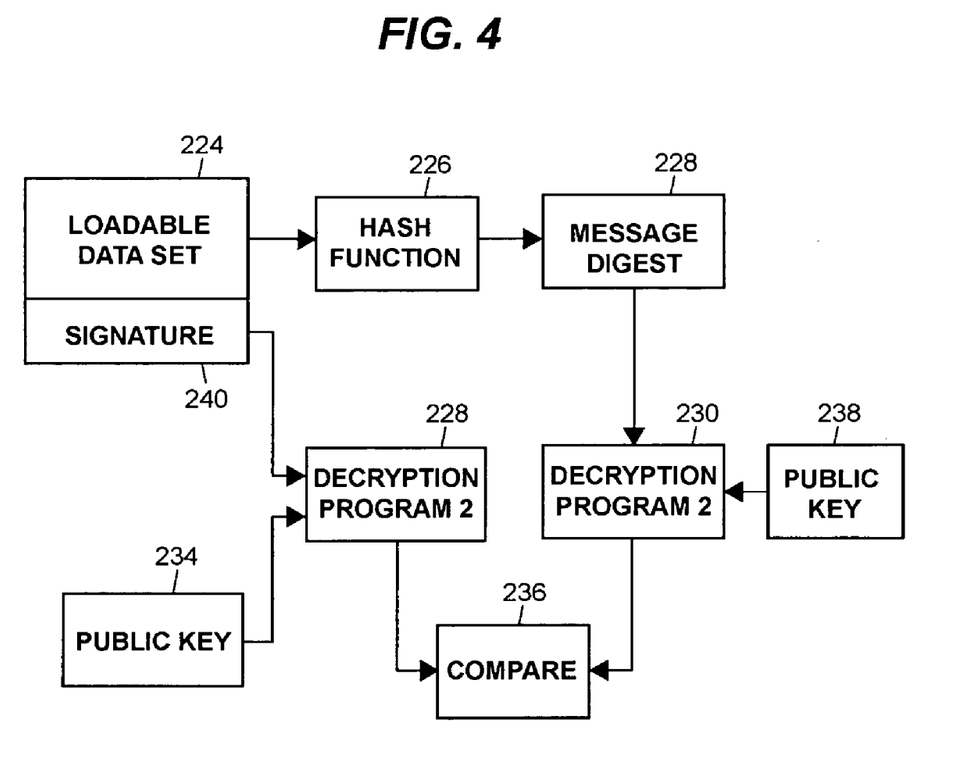
FIG. 4 is a diagram of a process for verifying a loadable data set has not changed during operation of the gaming device.

In one embodiment, the shared objects for a particular application and their corresponding signatures are stored 224 in flash memory. When the shared objects are called, it is copied into RAM, where it is hashed 226 on a frequent periodic basis. The shared objects may be hashed from flash memory, or loaded into RAM and then hashed from RAM. Utilizing a Linux, Unix or other similar operating system advantageously permits the location of data in RAM. Data verification in RAM has the distinct advantage that errors will be caught at the time they occur, rather than when the data is loaded or reloaded. This could save casinos untold amounts by avoiding the payment of jackpots and the like based on machine malfunction. Since hashing is a batch process, the process is not continuous. However, when the hashing takes relatively little time, such as 10 seconds for example, the process can repeat itself so that the data verification in RAM is in effect, continuous.

The message digest 228 created from hashing the shared object is preferably encrypted. A public key 238 is used to decrypt the message digest utilitizing a first decryption program. The signature 240 stored in flash memory is decrypted using a second decryption program via a public key 234 and the values are compared 236.

Although code verification of the gaming program shared objects has been described in detail above, code verification utilizing hash functions and signatures can be applied to verifying the authenticity of the linux kernel, modular modifications to the kernel, the operating system, game state data, random number generation data and the like. As added security, the present invention contemplates zeroing out all unused RAM to verify that no data in the form of code or other data was intentionally or unintentionally inserted.

In various embodiments, selected data is protected with encryption by signing the data with a digital signature that is verified to ensure integrity of the data. In some embodiments, the digital signature comprises signing the selected data with a signer's private key such that the data can only be decrypted by using the corresponding public key. Because only the intended signer knows his private key and documents encrypted with other private keys cannot be decrypted with the intended signer's public key, successful decryption of data with the intended signer's public key provides a degree of certainty that the data was signed or encrypted by the intended signer.

But, because public key/private key encryption algorithms typically take a relatively long time to encrypt large amounts of data, the encryption algorithm is more efficiently used in some embodiments to encrypt a unique characteristic of the data such as the hash value from a one-way hash function. In such an embodiment, the signer derives the reference hash value with a one-way hash function for the data to be signed, and encrypts the resulting hash value with his public key. One-way hash functions typically may be applied to data much more quickly than public key/private key algorithms, and so it is more desirable to process the entire data to be signed with a hash function than with a public key/private key algorithm. In some embodiments of the invention, only the hash value needs to be encrypted with public key/private key encryption, greatly reducing the time needed to sign or verify large amounts of data. To verify the signature, the hash value is decrypted with the intended signer's public key and the decrypted reference hash value is compared to a newly-computed hash value of the same data. If the reference hash value matches the newly-computed hash value, a degree of certainty exists that the signed data has not been altered since it was signed.

In some embodiments using digital signatures, the digital signature is that of a regulatory agency or other organization responsible for ensuring the integrity of data in computerized wagering game systems. For example, the Nevada Gaming Regulations Commission may apply a signature to data used in such gaming systems, ensuring that they have approved the signed data. Such an embodiment will be useful to ensure that game code executing in these systems has been approved and not altered since approval, and provides security both to the game operator or owner and to the regulatory commission. In other embodiments, the digital signature is that of the game code manufacturer or designer, and ensures that the game code has not been altered from its original state since signing.

Secure storage of the reference hash values or public keys in the systems described above is important, because data can be more easily forged if the reference hash values or public keys used to verify the integrity of the data can also be altered. For this reason, the reference hash values, public keys, or other encryption key data is stored in nonvolatile memory 204. In some embodiments, the nonvolatile memory 204 is a flash memory or EPROM that is programmable, but is not readily altered by a user of the computerized wagering game apparatus. The nonvolatile memory in such embodiments is reprogrammable, but reprogramming requires in various embodiments the use of special hardware, execution of restricted functions, or other secure methods. In other embodiments, the nonvolatile memory 204 is a programmable memory that is not alterable, requiring replacement of the nonvolatile memory each time new encryption key data is needed. Such embodiments have the advantage that the nonvolatile memory 204 must be physically removed and replaced to alter the data, providing a degree of access security and allowing visual verification of the identity of the nonvolatile memory and its contents.

In still other embodiments, the encryption key data is stored on the mass storage device. Further embodiments include storage of the encryption key data embedded in encryption functions, storage in secure areas of a hard disc drive mass storage device, or use of other security methods to protect the encryption key data.

These encryption methods in some embodiments of the invention are also applied to computerized gaming system communication over a network. Data communicated over a network is in various embodiments of the invention verified by use of a hash function, verified by use of public key/ private key encryption, verified by use of symmetric encryption, or verified by use of digital signatures. Also, a variety of key exchange or key negotiation protocols exist which in some embodiments of the invention provide the capability for a networked computerized gaming system to publicly agree with another networked computer system on encryption keys that may be subsequently used to communicate securely over a network.

Such network communication methods are utilized in the invention to provide for secure exchange of data between computerized wagering game systems and other networked computer systems. For example, control commands that control certain aspects of the operation of the computerized wagering games are securely sent over a network in some embodiments of the invention. Such commands may include increasing odds of payout on selected computerized wagering game systems, or changing the game program that is executed on selected computerized wagering game systems at selected times of the day. The computerized wagering games in some embodiments securely report game data such as bookkeeping data to a networked computer 207 via encryption. In still other embodiments of the invention, wagering game program data is securely transmitted over the network to the computerized wagering game systems, providing a secure way to provide new wagering games to the systems without physically accessing each computerized wagering game system. Various embodiments transmit other computerized wagering game data over a network connection via encryption, and are within the scope of this disclosure.

Because encryption methods typically provide a degree of security that is dependent on the effort and expense a hacker is willing to invest in defeating the encryption, replacement of encryption keys is employed in some embodiments of the invention. Digital signatures in some embodiments are valid only for a predetermined period of time, and in further embodiments have an associated date of expiry after which they may no longer be used. Such methods can also be used in various embodiments to license games for use for a certain period of time, after which they will not be properly verified due to expiry of the encryption keys used for data verification. Because hash functions typically produce hash values that are dependent entirely on the data being hashed, embodiments which incorporate expiry and replacement of reference hash values also require reissuance of modified data to produce a different hash value. For example, minor bug fixes, addition of new features, or any other small change in the data comprising a gaming program will be sufficient to produce a different reference hash value upon hashing the edited program data, resulting in an updated reference hash value corresponding to the updated data.

Other embodiments use a variety of keys among various computerized wagering games and game producers, reducing the risk and therefore the value of successfully defeating an encryption key. For example, a game producer in one embodiment employs a different digital signature for each customer of its computerized wagering games, ensuring that defeating the encryption key on a single game system affects a limited number of games. In another embodiment, a regulatory agency may change keys with which it signs games on a periodic basis, so that a successful hack of the keys used to sign the data results in potential compromise of only a limited and identifiable number of games. It will be obvious to one skilled in the art that many variations on key replacement and expiry policies exist, all of which are considered within the scope this disclosure.

An architecture and method for a gaming-specific platform are disclosed that features secure storage and verification of game code and other data, provides the ability to securely exchange data with a computerized wagering gaming system, and does so in a manner that is straightforward and easy to manage. Some embodiments of the invention provide the ability to identify game program code as certified or approved, such as by the Nevada Gaming Regulations Commission or other regulatory agency. These and other functions use encryption, including digital signatures and hash functions as well as other encryption methods.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A computerized wagering game apparatus, comprising:
  a computerized game controller having a processor for executing a game program, a memory comprising a random access memory (RAM), and a nonvolatile storage, the computerized game controller operable to control the computerized wagering game apparatus; and game program stored in the nonvolatile storage and copied into the RAM, wherein the game program copied to the RAM is verified during execution and play of the computerized wagering game apparatus by hashing with a one-way hash function to produce a resulting hash value that is compared to a reference hash value using a continuously executing program thread executing on the computerized game controller during play of the computerized wagering game apparatus to continuously ensure that game program copied to the RAM has not changed since calculation of the reference hash value.

2. The computerized wagering game apparatus of claim 1, wherein the computerized wagering game apparatus is brought to a tilt state if the resulting hash value is not the same as the reference hash value.

3. The computerized wagering game apparatus of claim 1, wherein the reference hash value is stored in the nonvolatile storage.

4. The computerized wagering game apparatus of claim 1, wherein a system handler application loads and executes encryption functions which are subsequently used to securely load other game program from the nonvolatile storage.

5. The computerized wagering game apparatus of claim 1, wherein the game program is securely stored in the nonvolatile storage via encryption and is signed with a digital signature before said game program and signatures are copied to the random access memory.

6. The computerized wagering game apparatus of claim 5, wherein the digital signature comprises encryption of the gaming program with a signer's private key.

7. The computerized wagering game apparatus of claim 6, further comprising the nonvolatile storage storing a public key corresponding to the signer's private key.

8. The computerized wagering game apparatus of claim 5, wherein the digital signature comprises encryption with a signer's private key of a hash value produced by hashing the gaming program with a one-way hash function.

9. The computerized wagering game apparatus of claim 8, wherein the nonvolatile storage storing a public key corresponding to the signer's private key.

10. The computerized wagering game apparatus of claim 5, wherein the gaming program signed with a digital signature is signed with a digital signature from a regulatory organization, thereby signifying organization approval of the gaming program.

11. The computerized wagering game apparatus of claim 1, wherein the computerized game controller is a general-purpose computer.

12. The computerized wagering game apparatus of claim 11, wherein the general-purpose computer is a PC-compatible computer.

13. The computerized wagering game apparatus of claim 1, further comprising a network interface connecting the computerized wagering game apparatus to a networked computer.

14. A method for continuously verifying authenticity of game data of a computerized wagering game apparatus, the method comprising:
copying game data stored in a nonvolatile storage of the computerized wagering game apparatus to a RAM of the computerized wagering game apparatus;
continuously hashing the game data copied to the RAM with a one-way hash function in a continuously executing thread to produce a resulting hash value;
comparing the resulting hash value to a reference hash value in a continuously executing thread to ensure that game the data has not changed since calculation of the reference hash value;
wherein the copying, hashing and comparing are carried out continuously during execution of the computerized wagering game apparatus.

15. The method of claim 14, further comprising encryption of game data communicated via the computerized wagering game apparatus over a network.

16. The method of claim 15, wherein the game data communicated over the network comprises instructions to control the operation of the computerized wagering game apparatus.

17. The method of claim 15, wherein the game data communicated over the network comprises shared objects for execution on the computerized wagering game apparatus.

18. The method of claim 15, wherein the game data communicated over the network comprises game data reported by the computerized wagering game apparatus.

19. The method of claim 14, wherein the reference hash value is stored in the nonvolatile storage that comprises a part of the computerized wagering game apparatus.

20. The method of claim 14, further comprising bringing the computerized wagering game apparatus to a tilt state if the resulting hash value is not the same as the reference hash value.

21. The method of claim 14, further comprising encryption of the game data copied to the RAM of the computerized gaming apparatus, the encryption comprises signing the game data with a digital signature.

22. The method of claim 21, wherein signing the game data with a digital signature comprises encryption of the game data with a signer's private key.

23. The method of claim 22, wherein a public key corresponding to the signer's private key is stored in the nonvolatile storage.

24. The method of claim 22, wherein signing the game data with a digital signature comprises:
computing a hash value from the game data produced with a one-way hash function; and
encrypting the hash value with a signer's private key.

25. The method of claim 24, wherein a public key corresponding to the signer's private key is stored in the nonvolatile storage.

26. The method of claim 21, wherein the encrypting of the game data comprises use of a symmetric encryption algorithm to encrypt game data.

27. The method of claim 14, wherein the computerized wagering game apparatus comprises a general-purpose computer.

28. The method of claim 27, wherein the general-purpose computer comprises a PC-compatible computer.

29. A computerized wagering game apparatus, comprising:
a computerized game controller having a processor, a main memory comprising a random access memory (RAM) and a nonvolatile storage and operable to control the computerized wagering game apparatus;
gaming program code and gaming program code signature stored in the nonvolatile storage, and
an authentication program stored in nonvolatile storage, wherein the authentication program, when executed, continually copies gaming program code and game program code signature from the nonvolatile storage to the RAM during execution of the gaming program code and continually verifies that the gaming program code has not changed by means of generating a message digest from the gaming program code copied to the RAM, decrypting the message digest using a first decryption program; decrypting the gaming program code signature with a second decryption program and comparing the two decrypted messages to verify that they are identical, wherein the authentication program is continuously executed on the gaming program code copied to the RAM by a continuously executing program thread executing on the computerized game controller during play of the computerized wagering game apparatus by a player.

* * * * *